Feb. 16, 1937.   S. C. McCOMBS   2,070,638
OIL SEAL
Filed Dec. 16, 1935
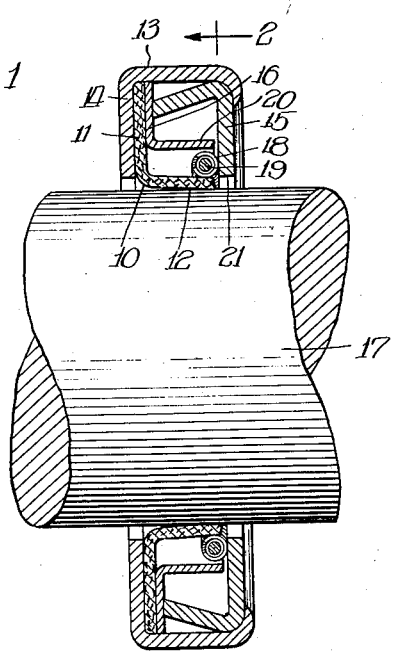
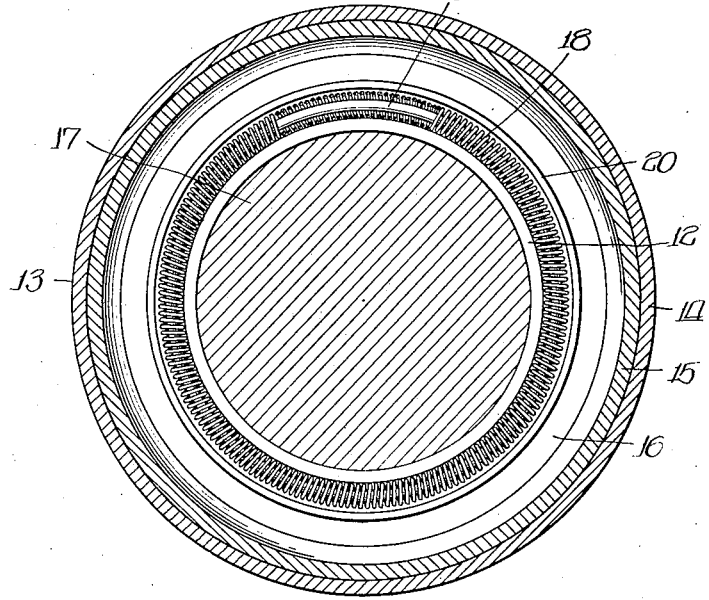
Inventor:
Stuart C. McCombs, Patented Feb. 16, 1937

2,070,638

UNITED STATES PATENT OFFICE 2,070,638

OIL SEAL

Stuart C. McCombs, Detroit, Mich., assignor to Chicago Rawhide Manufacturing Company, Chicago, Ill., a corporation of Illinois Application December 16, 1935, Serial No. 54,599

4 Claims. (Cl. 288—1)

In self-contained oil seals of the type using a coil spring about the sealing portion of the packing difficulty is frequently experienced, particularly in the larger size of seals, in getting the spring to stay in place when the shaft or other rotatable member is temporarily withdrawn for any reason from within the oil-softened portion of the packing.

It has been proposed, as set forth in the application for patent filed by Jens Agger on November 20, 1935, under Serial No. 50,687, to overcome this difficulty by the employment of a number of small circumferentially extending wire sections within the hollow interior of the spring, which wire sections are so connected with one of the other parts of the seal as to limit the extent to which the spring can contract and also limit the extent to which the spring when contracted can shift out of its normal centered position. These wire sections will accomplish the desired results if used in sufficient numbers, but they are difficult to assemble with the spring and consequently make the seal expensive to produce.

The object of this invention is to provide, in a seal of the character described, improved means for controlling the spring, which means will effectively prevent the spring from getting out of place and may be easily incorporated in the seal at but slight additional expense.

Other objects and advantages of the invention will be apparent to those skilled in the art upon a full understanding of the new spring control means.

In order that the invention may be readily understood, a preferred form of the same is presented herein, but it will of course be appreciated that the invention is susceptible of embodiment in other structurally modified forms coming equally within the scope of the appended claims.

In the accompanying drawing:

Fig. 1 is a sectional view of a seal which is constructed in accordance with the invention; and Fig. 2 is another sectional view of the same seal, taken on the line 2—2 of Fig. 1.

The seal which is shown in the drawing includes a leather packing 10 which has a radially extending flange portion 11 and an axially extending flange portion 12. The packing is mounted in a sheet metal casing 13 which is made up of two inversely nested cups 14 and 15 and an interposed inner shell 16. The radially extending portion 11 of the packing is clamped against the bottom of the cup 14 by the inner shell 16 and the latter is in turn held in position by the rim of the cup 15. The axially extending portion 12 of the packing is adapted to seal against a shaft 17 or other rotatable member and is encircled by an endless coil spring 18 under tension, which spring is held on the end of the portion 12 of the packing by contact with the bottom of the cup 15.

A wire ring 19 is located within the hollow interior of the spring 18. This ring fits loosely in the spring and does not have any effect on the latter as long as the axially extending seal portion 12 of the packing is distended by reason of its engagement with the shaft. When the portion 12 of the packing is not in engagement with the shaft, however, the ring 19 acts to limit the extent to which the spring 18 can constrict the portion 12.

The spring 18 is surrounded by a sleeve 20 which is spaced from the spring only far enough to accommodate the latter without binding when the sealing portion 12 of the packing is distended by engagement with the shaft. This sleeve is formed as an axially extending flange on the inner periphery of the inner shell 16, but it may of course be formed as a separate member or else as a portion of any of the other parts of the seal. When the sealing portion 12 of the packing is not in engagement with the shaft and the ring 19 in the spring is keeping the latter from following in the sealing portion 12 too far, the sleeve 20 will prevent the spring from dropping down to a point where the upper part of the spring can work out under the edge of the hole 21 in the end of the seal.

While the invention has been illustrated and described in connection with a self-contained sealing unit of one particular construction, it will of course be appreciated that the invention can be embodied in other kinds of sealing units and that certain features of the invention are applicable to a seal of the type which is adapted to have its parts assembled at the time of installation for service.

I claim:

1. In a self-contained seal, a casing, a packing in the casing provided with an axially extending flange for sealing engagement with a rotatable member, an endless coil spring for constricting the flange, a substantially non-contractible ring within the hollow interior of the spring for preventing the latter from contracting beyond a predetermined minimum diameter, and means surrounding the spring in closely spaced relation to the same for preventing the spring from dropping down into an eccentric position wherein its upper edge can work out through the adjacent end of the casing.

2. In a self-contained seal, a casing, a packing in the casing provided with an axially extending flange for sealing engagement with a rotatable member, an endless coil spring for constricting the flange, a substantially non-contractible ring within the hollow interior of the spring for preventing the latter from contracting beyond a predetermined minimum diameter, and a sleeve surrounding the spring in closely spaced relation to the same for preventing the spring from dropping down into an eccentric position wherein its upper edge can work out through the adjacent end of the casing.

3. In a self-contained seal, a casing, a packing in the casing provided with an axially extending flange for sealing engagement with a rotatable member, an inner shell in the casing for clamping the packing to the casing, an endless coil spring for constricting the flange of the packing, a wire ring within the hollow interior of the spring for preventing the latter from contracting beyond a predetermined minimum diameter, and an axially extending flange on the inner shell surrounding the spring in closely spaced relation to the latter for preventing the spring from dropping down into an eccentric position wherein its upper edge can work out through the end of the casing.

4. In a seal, a packing, an endless coil spring for constricting the packing, a substantially non-contractible ring within the hollow interior of the spring for preventing the latter from contracting beyond a predetermined minimum diameter, and means surrounding the spring in closely spaced relation to the latter for limiting the extent to which the spring may move out of its normal centered position.

STUART C. McCOMBS.